United States Patent [19]

Kiyohara et al.

[11] Patent Number: 4,877,819
[45] Date of Patent: Oct. 31, 1989

[54] PROCESS FOR PRODUCING POLYESTER RESIN COMPOSITION

[75] Inventors: Kazuto Kiyohara; Toshiyuki Hagiwara; Takanori Nakadate; Ichiya Harada, all of Hino; Kentaro Noguchi, Hofu; Shigeru Sakae, Hofu; Kazuhiro Okuma, Hofu, all of Japan

[73] Assignees: Konica Corporation; Kanebo Ltd., both of Japan

[21] Appl. No.: 184,390

[22] Filed: Apr. 21, 1988

[30] Foreign Application Priority Data

Apr. 23, 1987 [JP] Japan .................................. 62-100917

[51] Int. Cl.$^4$ ............................ C08K 9/02; C08K 3/22
[52] U.S. Cl. ..................................... 523/200; 523/216; 523/351; 524/497; 524/605
[58] Field of Search ............... 523/200, 216, 351, 212, 523/213; 524/497, 605

[56] References Cited

U.S. PATENT DOCUMENTS 3,770,470 11/1973 Swank .................................. 523/200
4,349,389 9/1982 Schofield ............................ 523/216

FOREIGN PATENT DOCUMENTS 61-246236 11/1986 Japan .

Primary Examiner—Lewis T. Jacobs
Attorney, Agent, or Firm—Jordan B. Bierman

[57] ABSTRACT

A process for producing a titanium dioxide containing polyester resin composition from which a white film useful as a reflective photographic support can be prepared is disclosed.

Said process is performed by first supplying a polyester resin and titanium dioxide into a continuous kneading extruder, kneading them in molten state, and supplying an additional charge of the polyester resin to give a desired concentration of the titanium dioxide, wherein the first supplied polyester resin has an intrinsic viscosity of at least 0.40, said titanium dioxide having an average particle size of 0.1–0.5 μm and a water content of no more than 0.5% and having been surface-treated with an aluminum compound and/or a silicon compound, and the concentration of titanium dioxide being in the range of 20–70 wt % when kneaded with the polyester resin in molten state.

8 Claims, No Drawings

PROCESS FOR PRODUCING POLYESTER RESIN COMPOSITION

BACKGROUND OF THE INVENTION

The present invention relates to a process for producing a titanium dioxide containing polyester resin composition. More particularly, the present invention relates to a process for producing a polyester resin composition from which a white film useful as a reflective photographic support can be prepared.

White inorganic pigments typified by titanium dioxide are conventionally dispersed in polyester resins typified by polyethylene terephthalate (PET) by either one of the following methods: adding such pigments per se; or suspending them in an ester-forming polyhydric alcohol such as ethylene glycol to prepare a slurry and adding the slurry during the process of esterification or polycondensation. The latter method is disclosed in many prior patents such as Japanese Patent Publication Nos. 945/1958 and 18135/1981. But this method has the problem that the particles of titanium dioxide added tend to agglomerate and precipitate in ethylene glycol or the resulting polymer, and the amount of titanium dioxide that can be incorporated is no more than several percent.

If one wants to incorporate a fairly large amount ($\geq 10\%$) of titanium dioxide in the polyester resin, it is common practice to perform kneading with such equipment as a continuous kneading extruder. Methods for adding titanium dioxide and other white inorganic pigments to polyester resins by means of a continuous kneading extruder are described in Japanese Patent Application (OPI) Nos. 246236/1986 and 250034/1986 (the term "OPI" as used herein means an unexamined published Japanese Patent Application). The method described in Japanese Patent Application (OPI) No. 246236/1986 comprises dry blending a pigment with a polyester resin having a bulk density of no more than 0.6, blending them in molten state to prepare a master batch, and mixing the master batch with another feed of the polyester resin in molten state. However, providing a polyester resin with a bulk density of no more than 0.6 and dry blending it with a pigment are quite cumbersome steps and it frequently occurs that the added pigment particles are not uniformly dispersed in the resin.

The method disclosed in Japanese Patent Application (OPI) No. 250034/1986 comprises mixing a polyester resin with a pigment in molten state to prepare a master batch, subjecting the master batch to solid-phase polymerization, and mixing the resulting polymer with another feed of the polyester resin. This method has the following disadvantages: polymerization requires as long as 5 to 20 hours to complete; the method involves many steps; and as in the first method, it sometimes occurs that the added pigment particles are not uniformly dispersed in the polyester resins. Furthermore, the two methods have a common problem in that the resin can pick up color as it is subjected to two cycles of blending in molten state.

SUMMARY OF THE INVENTION

An object, therefore, of the present invention is to provide a process by which a polyester resin composition having a high concentration of titanium dioxide dispersed uniformly can be produced in fewer steps and within a short period of time.

This object can be attained by a process for producing a polyester resin composition by first supplying a polyester resin and titanium dioxide into a continuous kneading extruder, kneading them in molten state, and supplying an additional charge of the polyester resin to give a desired concentration of titanium dioxide, wherein the first supplied polyester resin has an intrinsic viscosity of at least 0.40, said titanium dioxide having an average particle size of 0.1–0.5 μm and a water content of no more than 0.5% and having been surface treated with an aluminum compound and/or a silicon compound, and the concentration of titanium dioxide being in the range of 20–70 wt % when kneaded with the polyester resin in molten state.

DETAILED DESCRIPTION OF THE INVENTION

The continuous kneading extruder used in the process of the present invention may be of any type that permits continuous kneading and extrusion, such as an extruder equipped with a kneading rotor or blades, a corotating or counter-rotating twin-screw kneading extruder, or a single-screw continuous kneader.

The polyester resin used in the present invention may of course be a thermoplastic resin solely composed of a polyester. Included within the scope of the "polyester resin" are blends of a polyester and other polymers or additives that are incorporated in such amounts that the resin characteristics of the polyester as the chief component will not be affected for practical purposes.

Polyester resins that can be used in the present invention are polymers of the condensation products of aromatic dicarboxylic acids (e.g., terephthalic acid, isophthalic acid, phthalic acid, and naphthalenedicarboxylic acid) and glycols (e.g., ethylene glycol, 1,3-propanediol and 1,4-butanediol), and specific examples are polyethylene terephthalate, polyethylene 2,6-dinaphthalate, polypropyeene terephthalate, polybutylene terephthalate, and copolymers thereof. Polyethylene terephthalate (hereinafter abbreviated as PET) is preferably used as a polyester resin in the present invention.

The polyester to be first supplied in the process of the present invention has an intrinsic viscosity of at least 0.40, preferably 0.50–1.20, more preferably 0.6–1.00. The term "intrinsic viscosity" used herein means the value as measured at 20° C. on a solution of the initially supplied polyester resin in a mixed solvent of phenol/1,1,2,2-tetrachloroethane (60:40 at weight ratio) and is hereinafter abbreviated as IV.

The titanium dioxide used in the present invention is preferably of the rutile and/or anatase type. The titanium dioxide has an average particle size of 0.1–0.5 μm and particles whose size is outside this range will not provide a satisfactory degree of whiteness or hiding power. The average particle size of the titanium dioxide can be measured by any known method such as electron microscopy or a precipitation technique.

The titanium dioxide used in the present invention has been surface treated with an aluminum compound and/or a silicon compound. The surface treatment is performed in order to impart affinity for the polyester resin by treating the particles of titanium dioxide with an aluminum compound (e.g. alumina) and/or a silicon compound (e.g. silica) that have an oxygen or hydroxyl bond. After this treatment, the titanium dioxide may be subjected to further surface treatments with metal soaps (e.g. zinc stearate, magnesium stearate and sodium palmitate), surfactants (e.g. alkylene oxide derivatives, aliphatic acid esters of polyhydric alcohols, quaternary ammonium salts, alkyl sulfate esters, and amino acids), silane and titanium coupling agents, silicone oil, alcohols (e.g. methanol and ethanol), and polyhydric alcohols (e.g. ethylene glycol).

The titanium dioxide used in the present invention has a water content of no more than 0.5%. The water content of titanium dioxide can be measured by the following method specified in "Pigment Test Methods, Section 21" under JIS K 5101: A prescribed amount of a sample is correctly measured in a pre-dried flat-bottom weighing bottle (50 ml) and spread on its bottom as uniformly as possible as a layer; after stoppering the bottle, its weight is measured; the stopper is then removed and both the bottle and the stopper are dried in a dryer held at 120° C. for 2 hours; they are transferred into a desiccator and left to cool; after replacing the stopper on the bottle, its weight is measured to determine the weight loss; the water content of the sample, K (%), can be calculated by the following formula: $K = L/S \times 100$ where L is the weight loss (g) and S is the mass of the sample (g). For the purposes of the present invention, it suffices that the water content of titanium dioxide is 0.5% and less when measured just prior to kneading with the polyester.

If the water content of the titanium dioxide is higher than 0.5%, the polyester resin, when mixed with the titanium dioxide in molten state, will undergo hydrolysis by the water in the latter. Another reason why titanium dioxide containing more than 0.5% water hould not be used is that the particles with such high water content will readily agglomerate to form coarse particles.

The titanium dioxide is surface-treated in order to provide it with affinity for the polyester resin and the surface treatment effected for this purpose is such that the water content of titanium dioxide is held at 0.5% and below.

When the titanium dioxide and polyester resin are supplied into a continuous kneading extruder in which the two components are kneaded in molten state, the concentration of titanium dioxide lies within the range of 20-70 wt %.

Titanium dioxide may be used in combination with other pigments in the process of the present invention. Pigments that can be used in combination with titanium dioxide include barium sulfate, silica, alumina, talc and calcium carbonate, which may be used either on their own or as admixtures.

Other additives in common use, such as brighteners, dyes, uv absorbers, antistats and antioxidants, may also be incorporated in amounts that will not be detrimental to the objective of the present invention.

Polymeric materials other than polyesters can also be added and suitable examples are polyolefins such as polyethylene and polypropylene.

The polyester resin and titanium dioxide supplied into a continuous kneading extruder are subjected to a kneading action in a zone equipped with kneading disks or rotor blades. In the kneading zone, high temperatures occur because of the heat generated by shearing action, so the barrel is preferably cooled with water.

After the initially supplied polyester is blended with titanium dioxide, an additional feed of polyester resin is supplied into the continuous kneading extruder. The IV of the additionally supplied polyester resin is not limited to any particular value but the IV of the initially supplied polyester resin and that of the additionally supplied polyester resin are preferably selected at values that produce maximum kneading effects while preventing the deterioration of the resins. The IV of the initially supplied polyester resin may or may not be the same as that of the additionally supplied polyester resin.

The process of the present invention is intended to be used in the production of polyester resin compositions having high concentrations of titanium dioxide, so the amount of additional feed of polyester resin is determined at such a value that the finally obtained resin composition will have a desired titanium dioxide concentration, for example, in the range of 10-50 wt %.

Whether supplied initially or afterward, the polyester resin used in the present invention may be charged into the continuous kneading extruder either in solid or molten state. The additionally supplied polyester is preferably in solid state because this permits the temperature of the resin to drop when melted.

The continuous kneading extruder may be furnished with a kneading unit (e.g. a kneading disk) or air vent that come into play in the period from the supply of an additional charge of polyester resin to the delivery of the resin composition.

As a result of the above procedure, a polyester resin composition having a high concentration of titanium dioxide uniformly dispersed therein will emerge from the continuous kneading extruder. The composition, as it emerges from the extruder, may be fed into a film forming apparatus either directly or after shaped into chips. In the latter case, the chips are preferably formed into a film after they are subjected to a heat treatment as shown in Japanese Patent Application (OPI) Nos. 184538/1986 and 186957/1986.

Films can be produced by any known method such as the one described in Japanese Patent Application (OPI) No. 118746/1986. The film thus produced is useful as a reflective photographic support. For the preparation of reflective photographic materials using this film, see prior patents such as Japanese Patent Application No. 118746/1986.

The following example is provided for the purpose of further illustrating the present invention but is in no way to be taken as limiting.

EXAMPLE

Various types of titanium dioxide were blended with a polyethylene terephthalate resin in a co-rotating twin-screw kneading extruder (Model PCM- 65 of Ikegai Iron Works, Ltd.) at die temperature of 280° C. with the screws rotating at 150 rpm to produce a throughout of 100 kg/h.

The types of titanium dioxide used are characterized in Table 1.

TABLE

| | Sample No. | Crystal form | Average particle size (μm) | Surface treatment | | Water content (%) |
|---|---|---|---|---|---|---|
| Present invention | A | anatase | 0.3 | $Al_2O_3$<br>$SiO_2$<br>ethylene glycol | 0.2%<br>0.2%<br>0.3% | 0.18 |
| | B | rutile | 0.2 | $Al_2O_3$<br>$SiO_2$ | 0.3%<br>0.3% | 0.22 |
| Comparison | C | anatase | 0.3 | not applied | | 0.37 |
| | D | anatase | 0.3 | $Al_2O_3$<br>polyvinyl | 4.0%<br>0.3% | 0.55 |

TABLE-continued

| Sample No. | Crystal form | Average particle size (μm) | Surface treatment | Water content (%) |
| --- | --- | --- | --- | --- |
| | | | alcohol | |

The kneading conditions are set forth in Table 2, in which Nos. 1 and 2 represent samples within the scope of the present invention and Nos. 3–7 are comparative samples.

The $TiO_2$ containing polyester compositions that had been passed through the kneading stage were discharged from the twin-screw kneading extruder, cooled with water and shaped into square pellets (3 mm×3 mm×3 mm).

A pellets was taken from each sample, melted on a glass plate, spread in a thin film and observed under a microscope (×100) to count the number of coarse (≧20 μm) particles. Five measurements were made and their average was taken.

The results are shown in Table 2. The color of the pellets obtained was measured with TC-1500DX, a color difference meter of Tokyo Denshoku K.K. The results of color measurement are expressed by the values of L, a and b according to Hunter's color difference formula and only the values of b denoting yellowness are given in Table 2. The greater the positive values of b, the more intense the yellowness of the samples under test.

TABLE 2

| | No. | $TiO_2$ | Initially supplied PET's IV | Additionally supplied PET's IV | $TiO_2$ intermediate concentration (%) | $TiO_2$ final concentration (%) | No. of coarse particles | b value of pellets |
| --- | --- | --- | --- | --- | --- | --- | --- | --- |
| Present | 1 | A | 0.70 | 0.60 | 35 | 20 | 1.2 | 1.5 |
| invention | 2 | B | 0.84 | 0.65 | 65 | 15 | 1.8 | 2.1 |
| Comparison | 3 | C | 0.64 | 0.69 | 35 | 17 | 6 | 4.2 |
| | 4 | C | 0.64 | 0.64 | 40 | 20 | 16 | 2.9 |
| | 5 | B | 0.30 | 0.65 | 60 | 15 | 21 | 2.3 |
| | 6 | A | 0.70 | 0.60 | 80 | 20 | 8 | 3.2 |
| | 7 | D | 0.70 | 0.60 | 40 | 20 | 12 | 2.9 |

As Table 2 shows, the process of the present invention successfully produced $TiO_2$ containing polyester resin compositions that featured a markedly improved uniformity in the dispersion of $TiO_2$ particles and which afforded increased whiteness with a reduced degree of yellowness.

Pellets of sample Nos. 1 and 2 were heated at 220° C. for 6 hours at 1 Torr and fed into an extruder at 290° C., from which the extrudates were brought into contact with a rotating chill drum so as to form amorphous sheets 1.1 mm thick. Each of the sheets was stretched first longitudinally at a draw ratio of 3.0 at 100° C., then transversely at a draw ratio of 3.0 at 110° C. The drawn sheets were heat-set at 200° C., cooled and wound up. The so prepared films had a thickness of 125 μm and were white and opaque. The drawing and shaping operations could be performed in a continuous stable manner. The films had a sufficient degree of whiteness and opacity to be useful as reflective photographic supports.

As will be understood from the foregoing description, the process of the present invention produces a $TiO_2$ containing polyester resin composition that is markedly improved in the uniformity of the dispersion of $TiO_2$ particles and which affords increased whiteness with a reduced degree of yellowness.

What is claimed is:

1. A process for producing a polyester resin composition by first supplying a polyester resin and titanium dioxide into a continuous kneading extruder, kneading them in molten state, and supplying an additional charge of the polyester resin to give a desired concentration of the titanium dioxide, wherein the first supplied polyester resin has an intrinsic viscosity of at least 0.40, said titanium dioxide having an average particle size of 0.1–0.5 μm and a water content of no more than 0.5% and having been surface-treated with an aluminum compound and/or a silicon compound, and the concentration of titanium dioxide being in the range of 20–70 wt % when kneaded with the polyester resin in molten state.

2. A process according to claim 1 wherein said polyester resin is selected from the group consisting of polyethylene terephthalate, polyethylene 2,6-dinaphthalate, polypropylene terephthalate and polybutylene terephthalate.

3. A process according to claim 2 wherein said polyester resin is polyethylene terephthalate.

4. A process according to claim 1 wherein the first supplied polyester resin has an intrinsic viscosity in the range of 0.50–1.20.

5. A process according to claim 4 wherein the first supplied polyester resin has an intrinsic viscosity in the range of 0.6–1.00.

6. A process according to claim 1 wherein said aluminum compound is alumina.

7. A process according to claim 1 wherein said silicon compound is silica.

8. A process according to claim 1 wherein the concentration of said titanium dioxide in said polyester resin composition is within the range of 10–50 wt %.

* * * * *